United States Patent
Jeong et al.

(10) Patent No.: US 12,127,126 B2
(45) Date of Patent: Oct. 22, 2024

(54) PAGING RECEPTION FOR USER EQUIPMENT IN IDLE AND INACTIVE STATE

(71) Applicant: Apple Inc., Cupertino, CA (US)

(72) Inventors: Kyeongin Jeong, Portland, OR (US); Sudeep Palat, Cheltenham (GB); Robert Zaus, Munich (DE); Alexandre Saso Stojanovski, Paris (FR); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/269,281

(22) PCT Filed: Sep. 26, 2019

(86) PCT No.: PCT/US2019/053175
§ 371 (c)(1),
(2) Date: Feb. 18, 2021

(87) PCT Pub. No.: WO2020/069144
PCT Pub. Date: Apr. 2, 2020

(65) Prior Publication Data
US 2021/0258882 A1    Aug. 19, 2021

Related U.S. Application Data (60) Provisional application No. 62/737,671, filed on Sep. 27, 2018.

(51) Int. Cl.
*G08C 17/00*    (2006.01)
*H04W 52/02*    (2009.01)
(Continued)

(52) U.S. Cl.
CPC ....... *H04W 52/0261* (2013.01); *H04W 68/02* (2013.01); *H04W 72/20* (2023.01)

(58) Field of Classification Search
CPC .. H04W 52/0261; H04W 72/20; H04W 68/02
(Continued)

(56) References Cited

U.S. PATENT DOCUMENTS

| | | |
|---|---|---|
| 2005/0180378 A1* | 8/2005 | Lee .................. H04W 4/06 370/345 |
| 2014/0016598 A1 | 1/2014 | Kwon et al. |

(Continued)

FOREIGN PATENT DOCUMENTS

| | | |
|---|---|---|
| CN | 104160755 A | 11/2014 |
| CN | 105409307 A | 3/2016 |

(Continued)

OTHER PUBLICATIONS

"Extended European Search Report for European Patent Application No. 19865162.2", Mailed Date: Mar. 9, 2022, 12 Pages.

(Continued)

*Primary Examiner* — Temica M Beamer
(74) *Attorney, Agent, or Firm* — Eschweiler & Potashnik, LLC (57) ABSTRACT

A network device (e.g., a user equipment (UE), a new radio NB (gNB), or other network component) can process or generate a one-step paging reception or a two-step paging reception based on being in a sub-state of an idle mode. A UE can enter into an idle state to enable a decreased power consumption of battery, and further reduce power consumption by only monitoring a PDCCH in response to operating in a camped on any cell state, and eliminate processing a paging message when in the camped on any cell state.

20 Claims, 5 Drawing Sheets

(51) Int. Cl.
*H04W 68/02* (2009.01)
*H04W 72/20* (2023.01)

(58) Field of Classification Search
USPC .......................................................... 370/311
See application file for complete search history.

(56) References Cited

U.S. PATENT DOCUMENTS

| | | | |
|---|---|---|---|
| 2014/0211750 A1 | 7/2014 | Larsson et al. | |
| 2015/0094065 A1* | 4/2015 | Su | H04W 36/30 |
| | | | 455/436 |
| 2017/0366236 A1* | 12/2017 | Ryoo | H04B 7/0617 |
| 2018/0192436 A1* | 7/2018 | Yi | H04W 72/23 |
| 2018/0263012 A1 | 9/2018 | Ryu et al. | |
| 2019/0181928 A1* | 6/2019 | Pan | H04B 7/02 |
| 2019/0373578 A1* | 12/2019 | Hong | H04W 76/28 |
| 2020/0120634 A1* | 4/2020 | Lee | H04W 68/02 |

FOREIGN PATENT DOCUMENTS

| | | |
|---|---|---|
| CN | 106330254 A | 1/2017 |
| CN | 107438972 A | 12/2017 |
| CN | 108419291 A | 8/2018 |

OTHER PUBLICATIONS

"Further discussion on WUS configurations and procedures", In 3GPP TSG RAN WG1 Meeting #91, Nov. 27-Dec. 1, 2017, 9 Pages.

"NR Paging Channel", In 3GPP TSG RAN WG1 Meeting 90bis, Oct. 9-13, 2017, 3 Pages.

"Multi-beam Paging for NR", In 3GPP TSG RAN WG1 Meeting #88, Feb. 13-17, 2017, 4 Pages.

"3rd Generation Partnership Project; Technical Specification Group Radio Access Network; NR; User Equipment (UE) procedures in Idle mode and RRC Inactive state", In 3GPP TS 38.304, Jun. 2018, 25 Pages.

International Search Report dated Jan. 15, 2020 for International Application No. PCT/US2019/053175.

3rd Generation Partnership Project; Technical Specification Group Radio Access Network; NR; User Equipment (UE) procedures in Idle mode and RRC Inactive state (Release 15). 3GPP TS 38.304 V15.5.0 (Sep. 2019).

"Remaining details on paging design." Source: Ericsson. Agenda Item: 7.1.3. 3GPP TSG RAN WG1 Meeting AH 1801, Vancouver, Canada, Jan. 22-26, 2018. R1-1800896.

"Emergency Call for RRC Inactive UE Camped on Any Cell." Source: MediaTek Inc. Agenda Item: 10.4.1.3.9. 3GPP TSG-RAN WG2 Meeting #103, Gothenburg, Sweden, Aug. 20-24, 2018. R2-1811175.

"DCI contents and formats." Source: Intel Corporation. Agenda item: 7.3.1.4. 3GPP TSG-RAN WG1 Meeting AH-1801, Vancouver, Canada, Jan. 22-26, 2018. R1-1800325.

International Preliminary Report on Patentability dated Mar. 23, 2021 for International Application No. PCT/US2019/053175.

3GPP tsg_ranWG1_RL1; R1-1720423; Nov. 18, 2017.

3GPP tsg_ranWG1_RL1, No. TSGR1_88; Panasonic Corporation,R1-1702761 Paging design for NR; Feb. 6, 2017.

3GPP tsg_ranwg1_rl1; R1-1808278_Modelling power consumption in NR modems_final; Aug. 11, 2018.

China Excellent Master's Theses; Chien, Sell selection in LTE idle mode; Oct. 15, 2014.

2012 9th International Conference on Fuzzy Systems and Knowledge; Jie Song; Fangwei Li,Power savings for cell search application with DRX feature in LTE; May 31, 2012.

Chinese Office Action for Chinese Application No. 201980053930.4, Mailed Date Dec. 29, 2023.

* cited by examiner

PAGING RECEPTION FOR USER EQUIPMENT IN IDLE AND INACTIVE STATE

REFERENCE TO RELATED APPLICATIONS

This application is a National Phase entry application of International Patent Application No. PCT/US2019/053175 filed Sep. 26, 2019, which claims priority to U.S. Provisional Application No. 62/737,671 filed Sep. 27, 2018, entitled "PAGING RECEPTION FOR USER EQUIPMENT IN IDLE AND INACTIVE STATE," and is hereby incorporated by reference in its entirety.

FIELD

The present disclosure relates to wireless technology and more specifically to paging reception in an idle and an inactive state.

BACKGROUND

Mobile communication has advanced remarkably in the past two decades: emerging from early voice systems and transforming into today's highly sophisticated integrated communication platforms. The next generation wireless communication system, 5G, or new radio (NR) is going to provide ubiquitous connectivity and access to information, as well as ability to share data, around the globe. NR is expected to be a unified framework that will target to meet versatile and sometimes, conflicting performance criteria and provide services to vastly heterogeneous application domains ranging from Enhanced Mobile Broadband (eMBB) to massive Machine-Type Communications (mMTC) and Ultra-Reliable Low-Latency Communications (URLLC), to name a few. In general, NR will evolve based on third generation partnership project (3GPP) long term evolution (LTE)-Advanced technology with additional enhanced radio access technologies (RATs) to enable seamless and faster wireless connectivity solutions.

One major enhancement for LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever increasing growth of wireless data traffic. One of the important considerations for LTE to operate in unlicensed spectrum is to ensure fair co-existence with incumbent systems like wireless local area networks (WLANs), which has been the primary focus of LAA standardization effort since Rel. 13.

Following the trend of LTE enhancements, study on NR based access to unlicensed spectrum (NR-unlicensed) is ongoing starting with 3GPP Release (Rel)-15. The channel access mechanism aspect is one of the fundamental building blocks for NR-unlicensed for deployment options. The adoption of Listen-Before-Talk (LBT) in LTE based LAA system was crucial in achieving fair coexistence with the neighboring systems sharing the unlicensed spectrum in addition to fulfilling the regulatory requirements. In order to provide a global solution of unified framework, NR-based unlicensed access will also use LBT based channel access mechanisms. Because wideband operation is one of the key building blocks for enabling NR-unlicensed operation, it is essential to support mechanisms that would facilitate wideband operation by utilizing dynamic bandwidth adaptation in an efficient manner.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
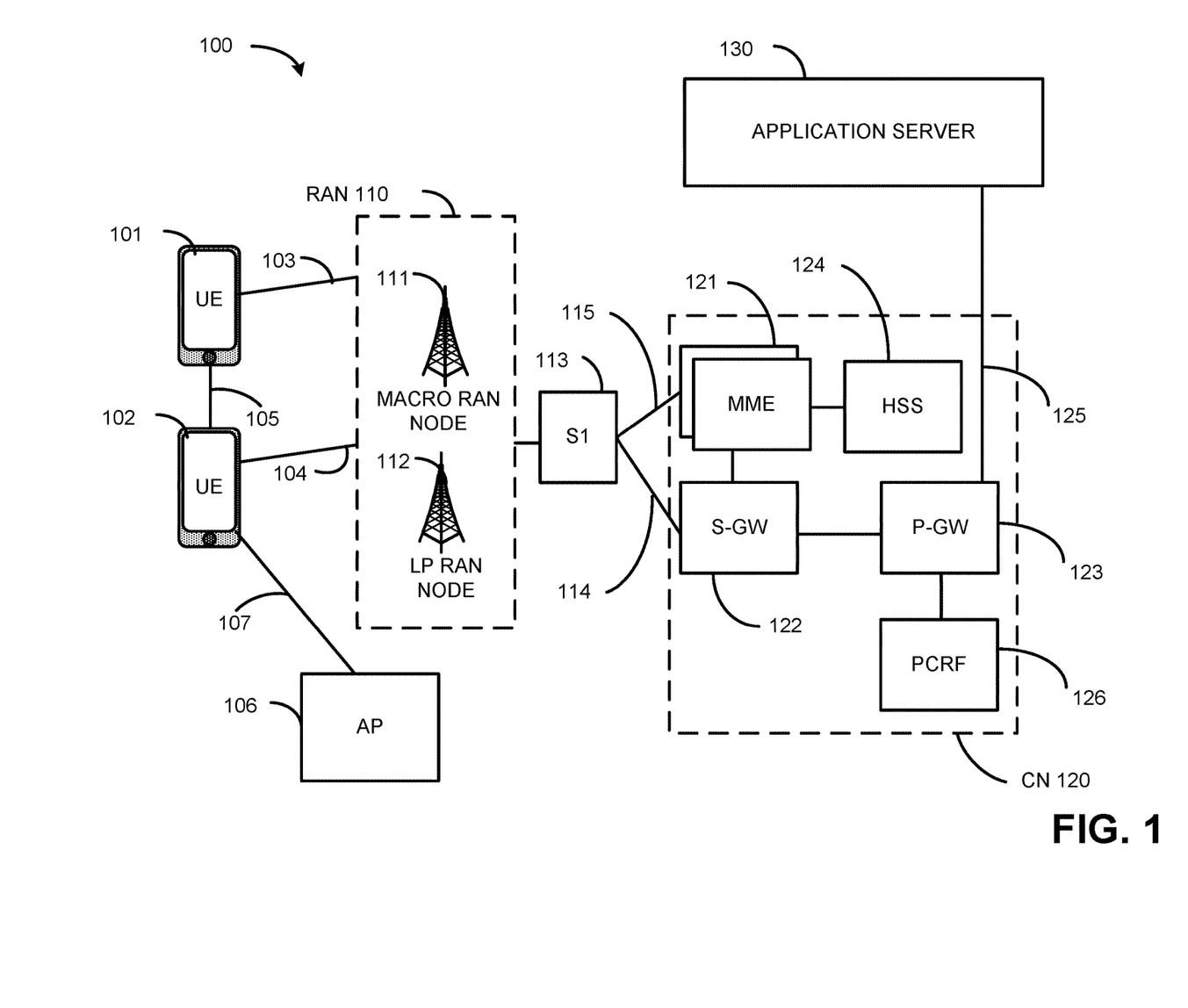
FIG. 1 is a block diagram illustrating an example of user equipment(s) (UEs) and gNBs or access nodes in a network with network components useable in connection with various embodiments (aspects) described herein.

Embodiments described herein can be implemented into a system or network device using any suitably configured hardware and/or software. FIG. 1 illustrates architecture of a system 100 of a network in accordance with embodiments herein. The system 100 is shown to include a user equipment (UE) 101 and a UE 102. As used herein, the term "user equipment" or "UE" can refer to a device with radio communication capabilities and can describe a remote user of network resources in a communications network. The term "user equipment" or "UE" can be considered synonymous to, and can be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" can include any type of wireless/wired device or any computing device including a wireless communications interface. In this example, UEs 101 and 102 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, or communicatively couple with a radio access network (RAN) 110. The RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" can refer to any transmission medium, either tangible or intangible, which is used to communicate data or a data stream. The term "channel" can be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" can refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 can be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X can be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 can collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 can be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 can be configured to utilize LTE-WLAN aggregation (LWA) operation and/or WLAN LTE/WLAN Radio Level Integration with IPsec Tunnel (LWIP) operation. The LWA operation can involve the UE 102 in RRC_CONNECTED being configured by a RAN node 111, 112 to utilize radio resources of LTE and WLAN. LWIP operation can involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling can include encapsulating entirety of original IP packets and adding a new packet header, thereby protecting the original header of the IP packets.

The RAN 110 can include one or more access nodes that enable the connections 103 and 104. As used herein, the terms "access node," "access point," or the like can describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" can refer to any transportation infrastructure entity implemented in or by a gNB/eNB/RAN node or a stationary (or relatively stationary) UE, where an RSU implemented in or by a UE can be referred to as a "UE-type RSU", an RSU implemented in or by an eNB can be referred to as an "eNB-type RSU." The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, etc.).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120 via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121. The embodiments herein are also applicable to a 5G system architecture in a New Radio (NR) access network as referenced in TS 23.501 also.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Rules Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
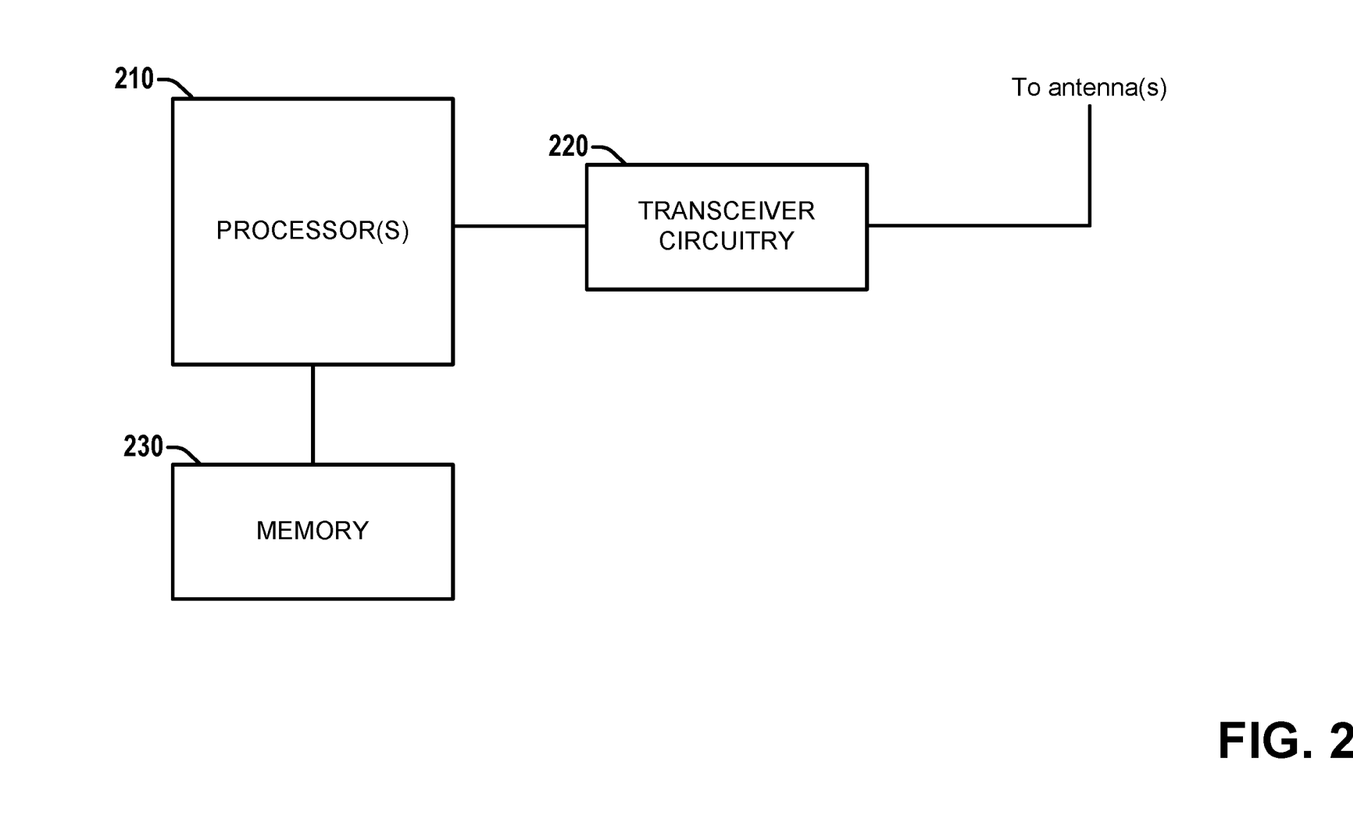
FIG. 2 is a block diagram illustrating a system employable at a UE or gNB, according to various embodiments described herein.

Referring to FIG. 2, illustrated is a block diagram of a system/device 200 employable at a UE (e.g., UEs 101/102) or other network device (e.g., gNB/eNB 111/112) that facilitates one or more aspects/embodiments herein. System 200 can include one or more processors 210 (e.g., one or more baseband processors such as one or more of the baseband processors discussed in connection with the other FIGs.) comprising processing circuitry and associated interface(s), transceiver circuitry 220 (e.g., comprising part or all of RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

If there is no data traffic activity for an extended period of time, then the device 200 can transition off to an RRC_Idle state (also called idle mode), where it disconnects from the network and does not perform operations such as channel quality feedback, handover, etc., or alternatively to an RRC_INACTIVE state where it monitors for a paging message with a previously communication configuration stored if previously connected (RRC_CONNECTED). The UE can also monitor paging in RRC_INACTIVE state. A main different between IDLE and INACTIVE states is that the UE stores a previous configuration (and this is not necessarily primarily the paging configuration) and the RNA update procedure. The device 200 goes into a very low power state and it performs paging reception where again it periodically wakes up to listen to the network and then powers down again. The device 200 can not receive data in this state, in order to receive data, it must transition back to RRC_Connected state.

The RRC_IDLE state and RRC_INACTIVE state tasks can be subdivided into three processes: PLMN selection; Cell selection and reselection; and Location registration and Radio Access Network (RAN)-based Notification Area (RNA) update. PLMN selection, cell reselection procedures, and location registration are common for both RRC_IDLE state and RRC_INACTIVE state. RNA update is only applicable for RRC_INACTIVE state. When UE 101, for example, selects a new PLMN, the UE 101 transitions from RRC_INACTIVE to RRC_IDLE.

When a UE is switched on, a public land mobile network (PLMN) is selected by the non-access stratum (NAS). For the selected PLMN, associated Radio Access Technology (ies) RAT(s) can be set as indicated at 3GPP TS 23.122. The NAS provides a list of equivalent PLMNs, if available, that the access stratum AS uses for cell selection and cell reselection. With cell selection, the UE 101 searches for a suitable cell of the selected PLMN, chooses that cell to provide available services, and monitors its control channel. This procedure is referred to as, or defined as "camped/camping on the/a cell".

The UE 101 then can register its presence, by means of a NAS registration procedure, in the tracking area of the chosen cell. As an outcome of a successful Location Registration, the selected PLMN then becomes the registered PLMN according to 3GPP TS 23.122.

If the UE 101 finds a more suitable cell, according to the cell reselection criteria, it reselects onto that cell and camps on it. If the new cell does not belong to at least one tracking area to which the UE is registered, location registration is performed. In RRC_INACTIVE state, if the new cell does not belong to the configured RNA, an RNA update procedure is performed.

The UE 101 can search for higher priority PLMNs at regular time intervals as described in 3GPP TS 23.122 and search for a suitable cell if another PLMN has been selected by NAS. Registration is not performed by UEs (e.g., 101, 102) only capable of services that need no registration. Although UE 101 is used for discussion herein, any UE or UE 102 could also be referred to or applicable, and the embodiments/descriptive aspects herein are not limited necessarily to any one UE for example, or likewise any one base state, gNB or eNB (e.g., 111).

The purpose of camping on a cell in RRC_IDLE state and RRC_INACTIVE state is fourfold: a) enable the UE to receive system information from the PLMN; b) when registered and if the UE wishes to establish an RRC connection or resume a suspended RRC connection, it can do this by initially accessing the network on the control channel of the cell on which it is camped; c) if the network needs to send a message or deliver data to the registered UE, it knows (in most cases) the set of tracking areas (in RRC_IDLE state) or RNA (in RRC_INACTIVE state) in which the UE 101 is camped (note: it can then send a "paging" message for the UE 101 on the control channels of all the cells in the corresponding set of areas, in which the UE then receives the paging message and can respond); and d) it enables the UE to receive ETWS and CMAS notifications.

The following three levels of services are provided while a UE 101 is in RRC_IDLE state: —Limited service (emergency calls, ETWS and CMAS on an acceptable cell); —normal service (for public use on a suitable cell); —operator service (for operators only on a reserved cell). The following two levels of services are provided while a UE is in RRC_INACTIVE state: —normal service (for public use on a suitable cell); —operator service (for operators only on a reserved cell).

On transition from RRC_CONNECTED to RRC_IDLE state or RRC_INACTIVE state, UE 101, for example, attempts to camp on a suitable cell according to redirectedCarrierInfo if included in the RRCRelease message used for this transition. If the UE 101 cannot find a suitable cell, the UE 101 can camp on any suitable cell of the indicated RAT. This can happen also at power on and not just on transition from Connected to IDLE/INACTIVE. If the RRCRelease message does not contain the redirectedCarrierInfo, UE shall attempt to select an acceptable cell on an NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated radio access technology (RAT). If the RRCRelease message does not contain redirectedCarrierInfo UE 101 can attempt to select an acceptable cell on an NR frequency. If no acceptable cell is found according to the above, the UE continues to search for an acceptable cell of any PLMN in state any cell selection.

When the UE in idle and inactive state receives a paging, it first receives the physical downlink control channel (PDCCH) Downlink Control Information (DCI) for the radio resource allocation for radio resource control (RRC) paging message and then receives the RRC paging message in a physical data channel or the physical downlink shared channel (PDSCH) over the allocated radio resource. Power saving for the UE 101 in idle and inactive state is important to enhance power savings or reduce the power consumption in the paging reception, which is an aim of embodiments herein.

The UE behaviors in idle and inactive state (mode) are defined in 3GPP specification TS 38.304. Idle state and inactive state are a kind of UE power saving state. UE's sub-state in idle state/mode and inactive state/mode can be defined as being as "camped normally state" or "camped on/in any cell state". INACTIVE is not in "camped on any cell state". A UE, for example, is camped on any cell state in an acceptable cell if it cannot find a suitable cell according to the UE's subscription—a cell of a PLMN in which it can successfully register. A suitable cell has to be also acceptable from an RF point of view. Additionally, in both cases (i.e. camped normally state and camped on any cell state), the UE 101, for example, receives a paging as a paging reception comprising two steps (i.e. PDCCH DCI reception and the associated PDSCH reception over the allocated radio resource). However, according to embodiments herein, based on the sub-state the UE only has to perform a one-step reception or a two-step reception.

When camped normally (camped/camping normally state), the UE 101 performs the following tasks: —monitors the paging channel of the cell as specified in clause 7 according to information broadcast in system information block SIB1; —monitoring relevant System Information as specified TS 38.331; —performs necessary measurements for the cell reselection evaluation procedure; —executes the cell reselection evaluation process on the following occasions/triggers: 1) UE internal triggers, so as to meet performance as specified in TS 38.133; 2) when information on the broadcast control channel (BCCH) used for the cell reselection evaluation procedure has been modified.

The camped on any cell state is only applicable for RRC_IDLE state or idle mode. In this state, the UE performs the following tasks: —monitors the paging channel of the cell as specified in clause 7 according to information broadcast in SIB1. There are different reasons for monitoring the paging channel for the camped normally and in camped in any cell state—for incoming Paging messages for DL traffic (only for camped normally), and for indication of presence of warning messages and system information changes (for both). The UE also performs the following tasks: —monitors relevant System Information as specified in TS 38.331; —perform necessary measurements for the cell reselection evaluation procedure; —execute the cell reselection evaluation process on the following occasions/triggers: 1) UE internal triggers, so as to meet performance as specified in TS 38.133; 2) When information on the BCCH used for the cell reselection evaluation procedure has been modified; —regularly attempt to find a suitable cell trying all frequencies of all RATs that are supported by the UE. If a suitable cell is found, UE 101 moves to the camped normally state.

In various embodiments herein, dependent on the UE's sub-state in idle and inactive mode(s), paging reception can be enhanced. A two-step paging reception (i.e. PDCCH DCI reception and the associated PDSCH reception over the allocated radio resource) is applied in the UE 101 when in camped normally state. A one step paging reception (i.e. PDCCH DCI reception only) is applied in the UE 101 when in camped on any cell state. By applying one step paging reception to the UE in camped on any cell state, the power consumed is less than for the case where two step paging reception is always applied in both sub-states.

Figure 3:
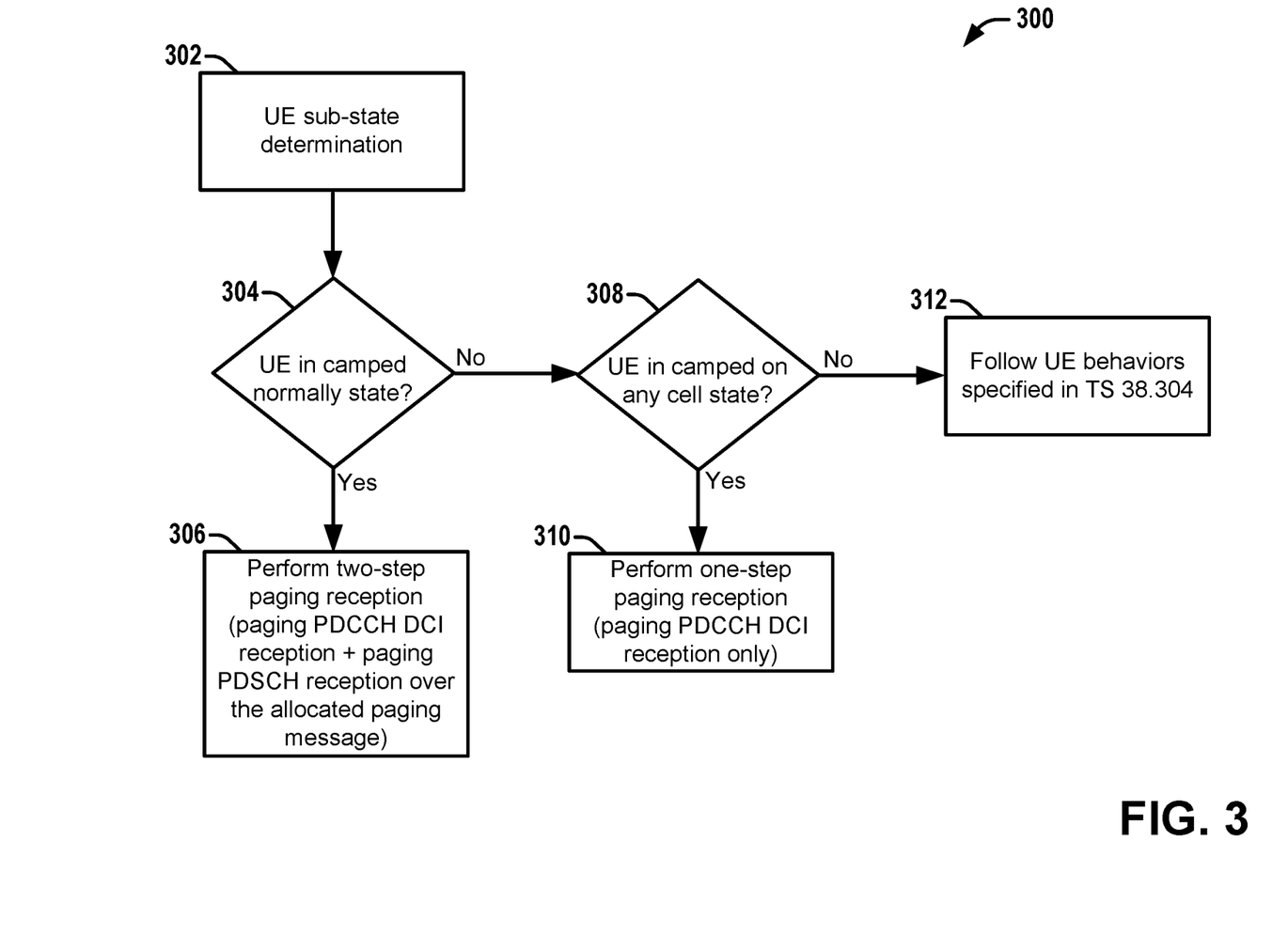
FIG. 3 is another block diagram illustrating a two or one step paging reception based on a UEs sub-state according to various embodiments described herein.

Referring to FIG. 3, illustrated is an example process flow 300 for paging reception in idle mode according to embodiments. At 302, the UE 101 determines its sub-state in idle and inactive state. How to determine its sub-state is also shown in the FIG. 4, which follows definition of suitable cell and acceptable cell as defined in TS 38.304, in which the details of subclauses 5.2.3.2 and 5.3.1 can be referenced in 3GPP TS 38.304 at Release 15 or beyond.

At 304, the UE 101 determines whether it is in camped normally state. If yes, the UE is, then it is able to receive calls and transition to a connected state, thus monitors for being contacted. If yes, the UE 101 receives/processes paging with two steps at 306 (i.e., first receives paging PDCCH DCI and then receives paging message in PDSCH over the resource allocated via PDCCH DCI). If the UE 101 is not in camped normally state sub-state, then the UE 101 determines at 308 whether it is in a camped on any cell state. If in the camped on any cell state, the UE 101 selects a cell irrespective of a public land mobile network (PLMN). This is the case where the UE 101 is not on a subscribed to network cell, but any cell is used by which is can received messages for early warning messages (e.g., ETWS message, CMAS message, or the like) or an indication of a system information change, for example. Thus, if the UE 101 is not in camped normally state sub-state and the UE 101 is in camped on any cell state, the UE 101 receives paging with one step (i.e. receives paging PDCCH DCI only) at 310. Here, the UE 101 only monitors the PDCCH for at least one of: indication of the presence of an early warning system message or a system information change indication in the PDCCH.

If the UE is neither in camped normally state nor camped on any cell state, the UE 101 process flows to 312 where the UE follows the specified behaviors defined in 3GPP TS 38.304. In order to enable one step paging reception for the UE 101 in camped on any cell state at 310, the network (or eNB/gNB 111, or other network component) can ensure there is no call-back to a UE 101 original emergency call while the UE 101 is in camped on any cell state and all other required information is all sent via paging PDCCH DCI only.

According to the UE's sub-state in idle and inactive, two step paging reception or one step paging reception can be performed. Two step paging reception can be done when the UE 101, for example, is in camped normally state and one step paging reception can be done when the UE 101 is in camped on any cell state. Two step paging reception is done by reception of paging PDCCH DCI first and then reception of paging PDSCH over the allocated radio resource. One step paging reception is done by reception of paging PDCCH DCI only. In one-step reception, only one physical channel is monitored or evaluated. In two-step reception, two physical channels are monitored or evaluated at a reception of a communication message.

Similarly, the eNB or gNB 111 can split the information that would be in a paging message and provide it in the PDCCH or a DCI of the PDCCH. For example, the paging message can comprise a UE identifier, while the PDCCH include an indication of the presence of an early warning message (e.g., ETWS, CMAS, or the like) or a system information change indication. As such, the eNB or gNB 111 can generate the PDCCH DCI based on or for the UE in a camped on any cell state to monitor the PDCCH only, and not have to evaluate a paging message. The paging message can still include a UE identifier, but when in camped on any cell state the UE does not examine or process it, and only monitors the PDCCH.

Figure 4:
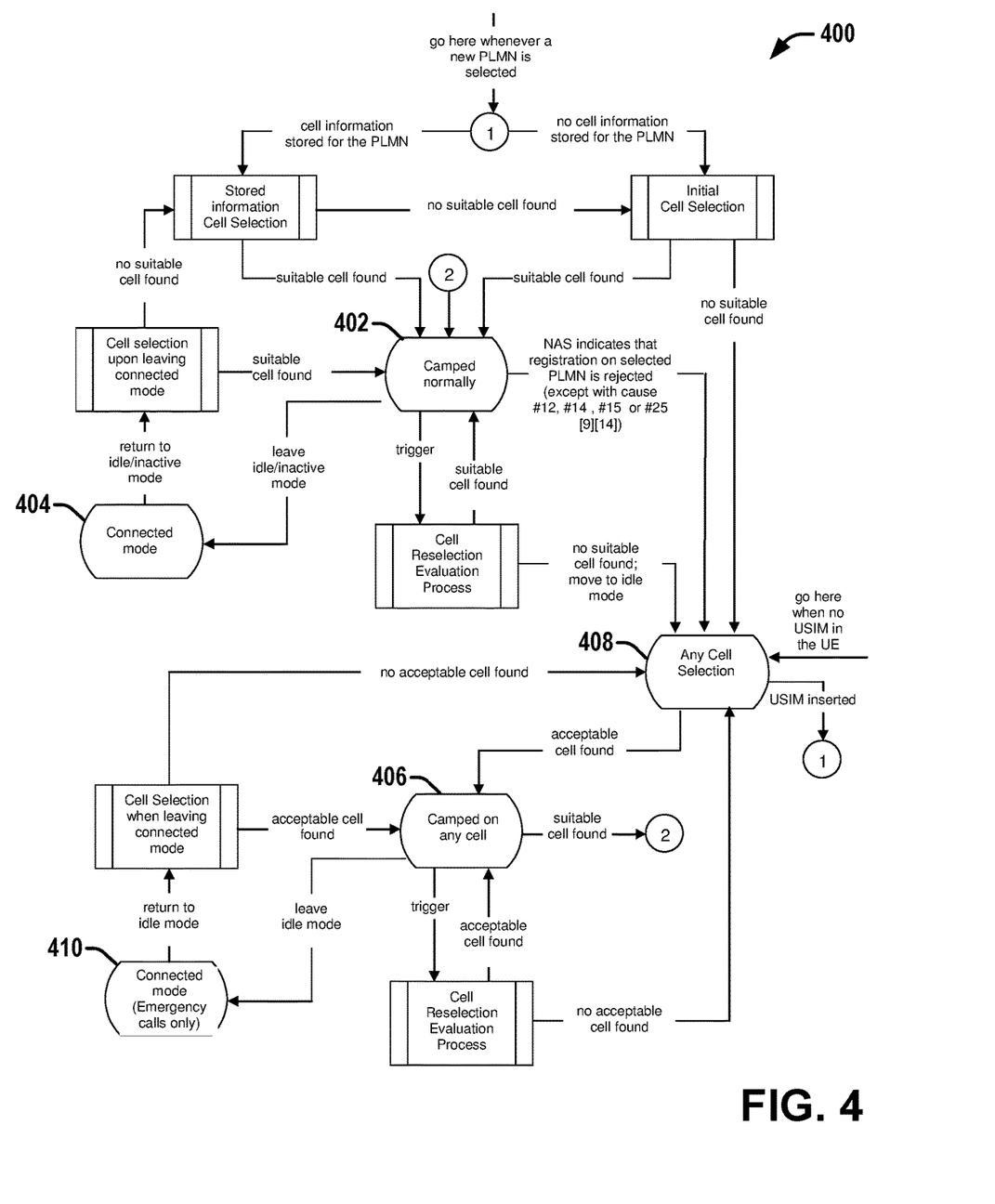
FIG. 4 is another block diagram illustrating sub-state transition in idle and inactive state according to various embodiments described herein.

Referring to FIG. 4, illustrated is an example process flow 400 demonstrating sub-state transitions in idle and inactive states according to TS 38.304 Section 5.2.6 Release 15 or beyond.

The cells are categorized according to which services they offer: acceptable cell and suitable cell. An "acceptable cell" is a cell on which the UE may camp to obtain limited service (originate emergency calls and receive ETWS and CMAS notifications). Such a cell can fulfil the following requirements, which is the minimum set of requirements to initiate an emergency call and to receive ETWS and CMAS notification in an NR network: —the cell is not barred, see sub-clause 5.3.1 of TS 38.304; —the cell selection criteria are fulfilled, see subclause 5.2.3.2 of TS 38.304.

A cell is considered as "suitable" if the following conditions are fulfilled: a) the cell is part of either: —the selected PLMN, or: —the registered PLMN, or—a PLMN of the Equivalent PLMN list; b)—the cell selection criteria are fulfilled, see subclause 5.2.3.2 of TS 38.304; according to the latest information provided by NAS: —the cell is not barred, see subclause 5.3.1; the cell is part of at least one tracking area (TA) that is not part of the list of "Forbidden Tracking Areas" as defined in TS 22.261, which belongs to a PLMN that fulfils the first bullet above.

If a UE has an ongoing emergency call, all acceptable cells of that PLMN are treated as suitable for the duration of the emergency call as the result of sub-state determination. If the UE is in camped normally sub-state 402, the UE101 receives paging with two steps (i.e. first receives paging PDCCH DCI and then receives paging message in PDSCH over the allocated resource via PDCCH DCI). Afterwards, the UE 101 in this state 402 can move from being idle/inactive to being in connected mode 404. A cell is a barred cell if it is so indicated in the system information. A cell is a reserved cell if it is so indicated in system information.

If the UE 101 is not in camped normally state sub-state and the UE is in camped on any cell state 406, the UE 101 receives paging with one step (i.e. receives paging PDCCH DCI only). If the UE 101 is neither in camped normally state nor camped on any cell state, the UE follows the specified behaviors defined in 3GPP TS 38.304. Note in order to enable one step paging reception for the UE in camped on any cell state, the network should make sure there is no call-back to the UE original emergency call while the UE is in camped on any cell state and all other required information is all sent via paging PDCCH DCI only.

In situations where no suitable cell is found and no acceptable cell is found the UE state can move to any cell selection 408. If the UE is in camped on any cell 406 it can leave idle when initiating an emergency call at 410. If the UE 101 loses coverage of the registered PLMN, either a new PLMN is selected automatically (automatic mode), or an indication of available PLMNs is given to the user so that a manual selection can be performed (manual mode).

Table 1 presents the functional division between UE non-access stratum (NAS) and UE access stratum (AS) in RRC_IDLE state and RRC_INACTIVE states.

| RRC_IDLE and RRC_INACTIVE state Process | UE Non-Access Stratum | UE Access Stratum |
|---|---|---|
| PLMN Selection | Maintain a list of PLMNs in priority order according to TS 23.122. Select a PLMN using automatic or manual mode as specified in TS 23.122 and request AS to select a cell belonging to this PLMN. For each PLMN, associated RAT(s) may be set. Evaluate reports of available PLMNs from AS for PLMN selection. Maintain a list of equivalent PLMN identities. | Search for available PLMNs. If associated RAT(s) is (are) set for the PLMN, search in this (these) RAT(s) and other RAT(s) for that PLMN as specified in [9]. Perform measurements to support PLMN selection. Synchronise to a broadcast channel to identify found PLMNs. Report available PLMNs with associated RAT(s) to NAS on request from NAS or autonomously. |
| Cell Selection | Control cell selection for example by indicating RAT(s) associated with the selected PLMN to be used initially in the search of a cell in the cell selection. | Perform measurements needed to support cell selection. Detect and synchronise to a broadcast channel. Receive and handle broadcast information. Forward NAS system information to NAS. Search for a suitable cell. The cells broadcast one or more 'PLMN identity' in the system information. Respond to NAS whether such cell is found or not. If associated RATs is (are) set for the PLMN, perform the search in this (these) RAT(s) and other RATs for that PLMN as specified in [9]. If a cell is found which satisfies cell selection criteria, camp on that cell. |
| Cell Reselection | Maintain a list of equivalent PLMN identities and provide the list to AS. | Perform measurements needed to support cell reselection. Detect and synchronise to a broadcast channel. Receive and handle broadcast information. Forward NAS system information to NAS. Change cell if a more suitable cell is found. |
| Location registration | Register the UE as active after power on. Register the UE's presence in a registration area, for instance regularly or when entering a new tracking area. Deregister UE when shutting down. | Report registration area information to NAS. |
| RAN Notification Area Update | Not applicable. | Register the UE's presence in a RAN-based notification area (RNA), periodically or when entering a new RNA. |

The following three levels of services are provided by the network to the UE while the UE is in RRC_IDLE state: Limited service (emergency calls, ETWS and CMAS on an acceptable cell); Normal service (for public use on a suitable cell); and Operator service (for operators only on a reserved cell).

The following two levels of services are provided by the network to the UE while the UE is in RRC_INACTIVE state: Normal service (for public use on a suitable cell); and Operator service (for operators only on a reserved cell).

Cell selection is performed by one of the following two procedures: initial cell selection (no prior knowledge of which RF channels are NR carriers); and cell selection by leveraging stored information.

In the initial cell selection procedure (no prior knowledge of which RF channels are NR carriers), the UE is to scan all RF channels in the NR bands according to its capabilities to find a suitable cell. On each carrier frequency, the UE need only search for the strongest cell. Once a suitable cell is found, this cell is to be selected.

The cell selection by leveraging stored information requires stored information of carrier frequencies and optionally also information on cell parameters from previously received measurement control information elements or from previously detected cells. Once the UE has found a suitable cell, the UE is to select it. If no suitable cell is found, the initial cell selection procedure in a) is to be started.

The cell selection criterion S in normal coverage is fulfilled when Srxlev>0 AND Squal>0, where $Srxlev = Q_{rxlevmeas} - (Q_{rxlevmin} + Q_{rxlevminoffset}) - P_{compensation} - Qoffset_{temp}$ and $Squal = Q_{qualmeas} - (Q_{qualmin} + Q_{qualminoffset}) - Qoffset_{temp}$.

where:

| | |
|---|---|
| Srxlev | Cell selection RX level value (dB) |
| Squal | Cell selection quality value (dB) |
| $Qoffset_{temp}$ | Offset temporarily applied to a cell as specified in [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMin-sul, if present, in SIB1, else Qrxlevmin is obtained from q-RxLevMin in SIB1. |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [9] |
| $Q_{qualminoffset}$ | Offset to the signalled $Q_{qualmin}$ taken into account in the Squal evaluation as a result of a periodic search for a higher priority PLMN while camped normally in a VPLMN [9] |
| $P_{compensation}$ | If the UE supports the additionalPmax in the NS-PmaxList, if present, in SIB1: $max(P_{EMAX1} - P_{PowerClass}, 0) - (min(P_{EMAX2}, P_{PowerClass}) - min(P_{EMAX1}, P_{PowerClass}))$ (dB); else: $max(P_{EMAX1} - P_{PowerClass}, 0)$ (dB) |

The signaled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN.

There are two mechanisms which allow an operator to impose cell reservations or access restrictions. The first mechanism uses indication of cell status and special reservations for control of cell selection and reselection procedures. The second mechanism, referred to as Unified Access Control TS 38.331, is to allow preventing UEs using selected access categories or access identities from sending initial access messages for load control reasons.

Cell status and cell reservations are indicated in the MasterInformationBlock or SystemInformationBlockType1 (SIB1) message by means of three fields: i) cellBarred (IE type: "barred" or "not barred") indicated in MasterInformationBlock message (in case of multiple PLMNs indicated in SIB1, this field is common for all PLMNs); cellReservedForOperatorUse (IE type: "reserved" or "not reserved") (indicated in SystemInformationBlockType1 message. In case of multiple PLMNs indicated in SIB1, this field is specified per PLMN); and cellReservedForOtherUse (IE type: "reserved" or "not reserved") indicated in SystemInformationBlockType1 message (in case of multiple PLMNs indicated in SIB1, this field is common for all PLMNs).

Figure 5:
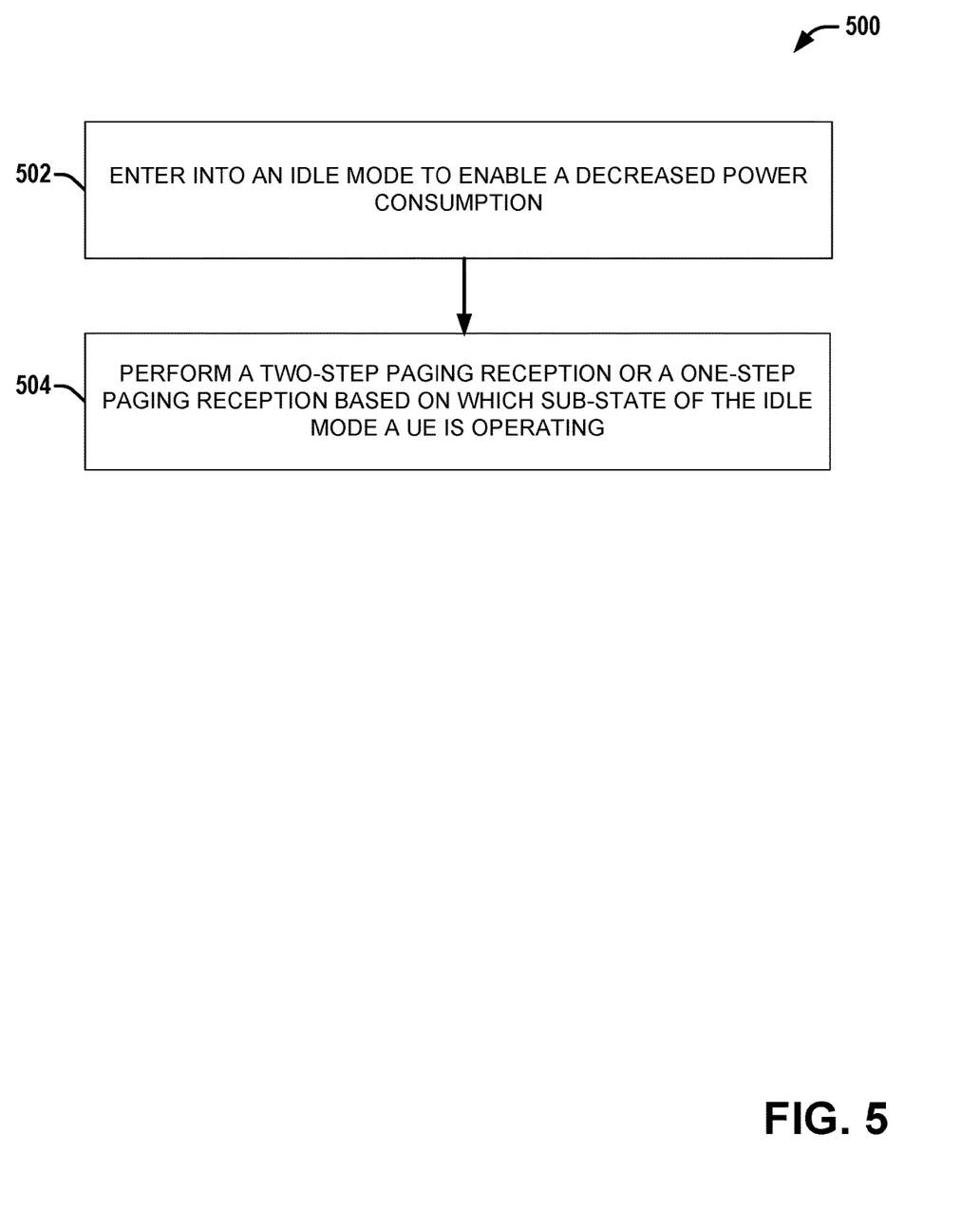
FIG. 5 is a block diagram illustrating an example process flow for power reduction in idle mode according to various embodiments described herein.

Referring to FIG. 5, illustrated is an example process flow 500 for a network device (e.g., a user equipment (UE), a new radio NB (gNB), 5GC component/network device or the like) that can process, generate, or monitor new radio (NR) communication via a 5G network system (5GS) to perform operations for reducing power consumption in camped on any cell state.

At 502, the process flow initiates with entering into an idle mode to enable decreased power consumption compared to just being in idle mode alone or compared to being in camped normally state.

At 504, the process flow continues with performing a two-step paging reception or a one-step paging reception based on which sub-state of the idle mode processes are operating in.

In other embodiments, the process flow comprises performing the two-step paging reception in response to being in a camped normally state, as well as performing the one-step paging reception in response to being in a camped on any cell state. The process flow includes monitoring only a physical downlink control channel PDCCH in response to operating in a camped on any cell state of the idle mode. This includes processing information of a physical downlink control channel (PDCCH) as the one-step paging reception.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a User Equipment (UE) for a new radio (NR) communication. The apparatus comprises: one or more processors configured to: enter into an idle mode to enable a decreased power consumption of battery; and monitor only a physical downlink control channel PDCCH in response to operating in a camped on any cell state of the idle mode. A radio frequency (RF) interface is configured to provide, to RF circuitry, data for a reception of the NR communication.

A second example can include the first example wherein the one or more processors are further configured to: enter into the idle mode by entering into the camped on any cell state in response to a cell being selected irrespective of a public land mobile network (PLMN) identity.

A third example can include the first or second example, wherein the one or more processors are further configured to: determine whether to perform a two-step paging reception or a one-step paging reception based on which sub-state of the idle mode that communication operations are being powered in.

A fourth example can include any one of the first through third examples, wherein the one or more processors are further configured to: perform a two-step paging reception in response to being in a camped normally state and a one-step paging reception in response to being in the camped on any cell state.

A fifth example can include any one of the first through fourth examples, wherein the one or more processors are further configured to: perform a two-step paging reception by processing a first reception of paging PDCCH and processing a second reception of paging physical downlink shared channel (PDSCH) based on an allocated radio resource of downlink control information (DCI) of the PDCCH.

A sixth example can include any one of the first through fifth examples, wherein the one or more processors are further configured to: perform a one-step paging reception by only processing the DCI of the PDCCH at reception of the NR communication.

A seventh example can include any one of the first through sixth examples, wherein the one or more processors are further configured to: reduce power in a paging reception by monitoring a presence of an early warning system message and a system information change indication only in the PDCCH.

An eighth example can include any one of the first through seventh examples, wherein the one or more processors are further configured to: in response to being in a camped normally state, determine a UE identifier in a paging message in a PDSCH based on a DCI of the PDCCH.

A ninth example is a computer readable storage device storing executable instructions that, in response to execution, cause one or more processors of User Equipment (UE) for a new radio (NR) communication to perform operations. The operations comprise: entering into an idle mode to enable a decreased power consumption; and performing a two-step paging reception or a one-step paging reception based on which sub-state of the idle mode processes are operating in.

A tenth example can include the ninth example, wherein the operations further comprise: performing the two-step paging reception in response to being in a camped normally state; and performing the one-step paging reception in response to being in a camped on any cell state.

An eleventh example can include any one of the ninth through tenth examples, wherein the operations further comprise: monitoring only a physical downlink control channel PDCCH in response to operating in a camped on any cell state of the idle mode.

A twelfth example can include any one of the ninth through eleventh examples, wherein the operations further comprise: processing information of a physical downlink control channel (PDCCH) as the one-step paging reception.

A thirteenth example can include any one of the ninth through twelfth examples, wherein the operations further comprise: processing information of a paging message of a physical downlink shared channel (PDSCH) and the information of the PDCCH as part of the two-step paging reception.

A fourteenth example can include any one of the ninth through thirteenth examples, wherein the information of the PDCCH comprises at least one of: an early warning system message or a system information change indication, the early warning system message comprising an Earthquake and Tsunami Warning System (ETWS) message or Commercial Mobile Alert System (CMAS) message.

A fifteenth example can include any one of the ninth through fourteenth examples, wherein the operations further comprise: reducing power in a camped in any cell state by monitoring for an early warning system message and a system information change indication only in a PDCCH.

A sixteenth example can include any one of the ninth through fifteenth examples, wherein the operations further comprise: in response to no acceptable cell being found, perform the one-step paging reception by only extracting one of: an early warning system message or a system information change indication from a PDCCH.

A seventeenth example can include any one of the ninth through sixteenth examples, wherein the operations further comprise: extracting one of: the early warning system message or the system information change indication from the PDCCH without processing a paging message.

An eighteenth example is an apparatus configured to be employed in a next generation NodeB (gNB) for a new radio (NR) communication comprising: one or more processors configured to: generate a paging message for a UE in a camped normally state; and generate a physical downlink control channel (PDCCH) comprising information that enables a UE in a camped on any cell state to only monitor the PDCCH. A radio frequency (RF) interface is configured to provide, to RF circuitry, data for transmitting the NR communication comprising one or more of: the paging message or the PDCCH.

A nineteenth example can include the eighteenth example, wherein the one or more processors are further configured to: provide information from the paging message to the PDCCH to enable the UE in the camped on any cell state to only monitor the PDCCH.

A twentieth example includes any one of the eighteenth through nineteenth examples, wherein the one or more processors are further configured to: enable the UE to perform a one-step paging reception based on the PDCCH in response to being in the camped on any cell state.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus comprising:
one or more processors coupled to a radio frequency (RF) interface with RF circuitry, the one or more processors configured to:
enter into an idle mode to enable a decreased power consumption of battery;
monitor a physical downlink control channel (PDCCH) in response to operating in a camped on any cell state of the idle mode;
determine whether to perform a two-step paging reception or a one-step paging reception based on which sub-state of the idle mode that communication operations are being powered in; and
receive, by the RF circuitry, a communication, according to the one-step paging reception or the two-step paging reception.

2. The apparatus of claim 1, wherein the one or more processors are further configured to:
enter into the idle mode by entering into the camped on any cell state in response to a cell being selected irrespective of a public land mobile network (PLMN) identity.

3. The apparatus of claim 1, wherein the one or more processors are further configured to:
perform the two-step paging reception in response to being in a camped normally state and the one-step paging reception in response to being in the camped on any cell state.

4. The apparatus of claim 1, wherein the one or more processors are further configured to:
perform the two-step paging reception by processing a first reception of paging PDCCH and processing a second reception of paging physical downlink shared channel (PDSCH) based on an allocated radio resource of downlink control information (DCI) of the PDCCH.

5. The apparatus of claim 4, wherein the one or more processors are further configured to:
perform the one-step paging reception by only processing the allocated DCI of the PDCCH at reception of the communication.

6. The apparatus of claim 1, wherein the one or more processors are further configured to:
reduce power in a paging reception by monitoring a presence of an early warning system message and a system information change indication only in the PDCCH.

7. The apparatus of claim 6, wherein the one or more processors are further configured to:
in response to being in a camped normally state, determine a user equipment (UE) identifier in a paging message in a PDSCH based on a DCI of the PDCCH.

8. A non-transitory computer readable storage device storing executable instructions that, in response to execution, cause one or more processors of User Equipment (UE) for a new radio (NR) communication to perform operations, the operations comprising:
entering into an idle mode to enable a decreased power consumption;
determining to perform a two-step paging reception or a one-step paging reception based on a sub-state of the idle mode; and
performing the two-step paging reception in response to the sub-state being a camped normally state, or
performing the one-step paging reception in response to the sub-state being a camped on any cell state.

9. The non-transitory computer readable storage device of claim 8, wherein the operations further comprise:
monitoring only a physical downlink control channel PDCCH in response to operating in a camped on any cell state of the idle mode.

10. The non-transitory computer readable storage device of claim 8, wherein the operations further comprise:
processing information of a physical downlink control channel (PDCCH) as the one-step paging reception.

11. The non-transitory computer readable storage device of claim 10, wherein the operations further comprise:
processing information of a paging message of a physical downlink shared channel (PDSCH) and information of the PDCCH as part of the two-step paging reception.

12. The non-transitory computer readable storage device of claim 10, wherein the information of the PDCCH comprises at least one of: an early warning system message or a system information change indication, the early warning system message comprising an Earthquake and Tsunami Warning System (ETWS) message or Commercial Mobile Alert System (CMAS) message.

13. The non-transitory computer readable storage device of claim 8, wherein the operations further comprise:
reducing power in a camped in any cell state by monitoring for an early warning system message and a system information change indication only in a PDCCH.

14. The non-transitory computer readable storage device of claim 8, wherein the operations further comprise:
in response to no acceptable cell being found, perform the one-step paging reception by only extracting one of: an early warning system message or a system information change indication from a PDCCH.

15. The non-transitory computer readable storage device of claim 14, wherein the operations further comprise:
extracting one of: the early warning system message or the system information change indication from the PDCCH without processing a paging message.

16. An apparatus comprising:
one or more processors configured to:
generate a paging message for a user equipment (UE) in a camped normally state or a camped on any cell state; and
transmit the paging message over a physical downlink control channel (PDCCH) for the UE in the camped on any cell state, wherein the paging message is for a one-step paging transmission, or
transmit a downlink control information (DCI) over PDCCH and transmit the paging message over a physical downlink shared channel (PDSCH) that is associated with the PDCCH for the UE in the camped normally state, wherein the paging message is for a two-step paging transmission.

17. The apparatus of claim 16, wherein the one or more processors are further configured to:
provide information from the paging message to the PDCCH to enable the UE in the camped on any cell state to only monitor the PDCCH.

18. The apparatus of claim 16, wherein the one or more processors are further configured to:
enable the UE to perform a one-step paging reception based on the PDCCH in response to being in the camped on any cell state.

19. The apparatus of claim 1, wherein the one or more processors are further configured to:
perform the one-step paging reception by only processing a downlink control information (DCI) of the PDCCH at reception of the communication.

20. The non-transitory computer readable storage device of claim 8, wherein the operations further comprise:
monitoring a paging channel for the one-step paging reception or the two-step paging reception.

* * * * *